(12) United States Patent
Amou

(10) Patent No.: US 6,178,415 B1
(45) Date of Patent: Jan. 23, 2001

(54) PHRASE RETRIEVING/SELECTING METHOD AND A COMPUTER-READABLE RECORDING MEDIUM WITH A PROGRAM MAKING A COMPUTER EXECUTE EACH STEP IN THE METHOD RECORDED THEREIN

(75) Inventor: Hiroki Amou, Tokushima (JP)

(73) Assignee: Justsystem Corp., Tokushima (JP)

( * ) Notice: Under 35 U.S.C. 154(b), the term of this patent shall be extended for 0 days.

(21) Appl. No.: 09/086,500

(22) Filed: May 29, 1998

(30) Foreign Application Priority Data

Sep. 18, 1997 (JP) .................................. 9-253908

(51) Int. Cl.[7] .................................. G06F 17/30
(52) U.S. Cl. .................................. 707/3; 707/5
(58) Field of Search .............................. 707/3, 5

(56) References Cited

U.S. PATENT DOCUMENTS

| | | | |
|---|---|---|---|
| 4,384,329 | * 5/1983 | Rosenbaum et al. | 364/300 |
| 4,703,425 | * 10/1987 | Muraki | 364/419 |
| 4,724,523 | * 2/1988 | Kucera | 364/419 |
| 5,606,498 | * 2/1997 | Muruta et al. | 395/757 |
| 5,771,378 | * 6/1998 | Holt et al. | 395/605 |

* cited by examiner

*Primary Examiner*—John Breene
*Assistant Examiner*—Cheryl Lewis
(74) *Attorney, Agent, or Firm*—McDermott, Will & Emery (57) ABSTRACT

A phrase retrieving/selecting method, in which a first condition for retrieving is set, a plurality of candidate conditions for retrieving used for setting other conditions for retrieving in addition to the set first condition for retrieving are displayed, any candidate condition for retrieving is specified and set from the displayed plurality of candidate conditions for retrieving as a second condition for retrieving, and the required phrase is retrieved and selected from a text expression dictionary according to the first and second conditions for retrieving, and a result of retrieving and selecting is displayed.

11 Claims, 8 Drawing Sheets

| HEADING PHRASES | CANDIDATE CONDITIONS FOR RETRIEVING | 201 |
|---|---|---|
| RUDE | SYNONYM, ANTONYM, RELATED WORD, WORD LEVEL, PHRASE LEVEL, ADVERBIAL (EXPRESSION), LITERARY, COLLOQUIAL, IDIOM OF FOUR CHARACTERS, LITTLE OLD STYLE | |
| ... | ... | |
| BEAUTIFUL | SYNONYM, ANTONYM, RELATED WORD, WORD LEVEL, PHRASE LEVEL, ADVERBIAL (EXPRESSION), LITERARY, COLLOQUIAL, IDIOM OF FOUR CHARACTERS, FOR FEMALE, FOR MALE, LITTLE OLD STYLE, COLUMN, WORD IN FASHION | |
| ... | ... | |
| SIMPLE | SYNONYM, ANTONYM, RELATED WORD, WORD LEVEL, PHRASE LEVEL, ADVERBIAL (EXPRESSION), LITERARY, COLLOQUIAL, IDIOM OF FOUR CHARACTERS, WORD IN FASHION | |
| ... | ... | |
| GENTLE | SYNONYM, ANTONYM, RELATED WORD, WORD LEVEL, PHRASE LEVEL, ADVERBIAL (EXPRESSION), LITERARY, COLLOQUIAL, IDIOM OF FOUR CHARACTERS, FOR FEMALE, FOR MALE, LITTLE OLD STYLE, WORD IN FASHION | |
| ... | ... | |

FIG.4

| SELECTED CANDIDATE CONDITION FOR RETRIEVING | EXCLUDED CANDIDATE CONDITION FOR RETRIEVING |
|---|---|
| SYNONYM | ANTONYM |
| ANTONYM | SYNONYM |
| RELATED WORD | ANTONYM |
| WORD LEVEL | PHRASE LEVEL, ADVERBIAL (EXPRESSION) |
| PHRASE LEVEL | WORD LEVEL, ADVERBIAL (EXPRESSION) |
| ADVERBIAL(EXPRESSION) | WORD LEVEL, PHRASE LEVEL |
| FOR FEMALE | FOR MALE |
| FOR MALE | FOR FEMALE |
| LITERARY | COLLOQUIAL |
| COLLOQUIAL | LITERARY |
| ⋮ | ⋮ |

PHRASE RETRIEVING/SELECTING METHOD AND A COMPUTER-READABLE RECORDING MEDIUM WITH A PROGRAM MAKING A COMPUTER EXECUTE EACH STEP IN THE METHOD RECORDED THEREIN

FIELD OF THE INVENTION

The present invention relates to a phrase retrieving/selecting method in which convenience in processing for retrieving and selecting a phrase can be improved by providing candidate conditions for retrieving that help a user in setting the retrieval condition and also to a computer-readable recording medium with a program making a computer execute each step in the method recorded therein.

BACKGROUND OF THE INVENTION

In recent years, in accordance with development of the technology on database retrieval, it has become possible to efficiently retrieve required information by entering conditions for retrieving. Under the circumstances as described above, there has been proposed a technology for retrieving, and extracting a desired phrase from an enormous amount of phrases, using the conditions for retrieving set by a user based on the phrase which the user desires to retrieve.

There are some examples of publications disclosing the above technology such as Japanese Patent Laid-Open Publication No. HEI 2-115974 with the title of "Language retrieval device", Japanese Patent Laid-Open Publication No. HEI 3-5883 with the title of "Word processing supporting device", and Japanese Patent Laid-Open Publication No. HEI 6-348691 with the title of "Word selecting method in a word processing device".

In the language retrieval device disclosed in Japanese Patent Laid-Open Publication No. HEI 2-115974, when the user wants to know a Japanese phrase having a certain meaning, he enters the meaning and any phrase having a corresponding notation from a dictionary in Japanese language according to the notation corresponding to the entered meaning is retrieved.

The word processing supporting device disclosed in Japanese Patent Laid-Open Publication No. HEI 3-5883 automatically executes extraction of key words and creation of retrieval expressions (for instance, Retrieval expression 1: "having a meal", Retrieval expression 2: "slim and long", and Retrieval expression 3: "substance") from a question made in natural language entered by the user (Example: "a pair of slim and long substances used when Japanese people have a meal"), and provides a desired noun ("a pair of chop sticks" in this example) by searching the dictionary.

In the word selecting method in a word processing device disclosed in Japanese Patent Laid-Open Publication No. HEI 6-348691, any phrase having the same concept as that of one or more words entered by the user is extracted and displayed based on a dictionary previously provided therein, and then the processing for further extracting and displaying some phrases having the same concept as those specified by the user from the displayed phrases is repeated so that a desired phrase can be specified.

Although it is possible to retrieve and extract a desired phrase from an enormous amount of phrases using conditions for retrieving in the conventional technology as described above, a result thereof is sometimes completely unexpected because the retrieval conditions as a reference for retrieval and selection are specified depending on the user's subjective concept of the desired phrase without entering any objective reference for retrieving.

In other words, it is necessary to set conditions for retrieving accurately expressing the concept in order to obtain a result the user desires, and, if retrieval and selection are performed with a condition for retrieving expressing a wide concept, a result of the retrieval satisfies the conditions for retrieving set by the user, but it is not a result of complete and strict retrieval, and even if a user sets a plurality of conditions for retrieving to obtain a result of retrieval based on strict conditions, when the plurality of conditions for retrieving express concepts contradictory to each other, it is impossible to obtain a result of retrieval, or the obtained result is far different from that which the user wants to obtain.

SUMMARY OF THE INVENTION

It is a first object of the present invention to improve convenience in processing for retrieving and selecting a phrase by providing candidate conditions for retrieving which help a user set a condition for retrieving to the user.

It is a second object of the present invention to make it possible to easily set an appropriate condition for retrieving by providing candidate conditions for retrieving to a user according to a concept of a phrase the user desires as a result of retrieving and selecting.

Further, it is a third object of the present invention to prevent, when a plurality of conditions for retrieving are to be set, a plurality of conditions for retrieving expressing concepts contradictory to each other from being set by providing a user candidate conditions for retrieving excluding those expressing the concepts contradictory to the condition having already been set, to prevent a result of retrieving and selecting different from the result the user desires from being specified, or to prevent a state in which no result of retrieving and selecting is obtained.

With the phrase retrieving/selecting method according to the present invention, a first condition for retrieving is set, a plurality of candidate conditions for retrieving used for adding and setting other conditions for retrieving in addition to the set first condition for retrieving are displayed, any candidate condition for retrieving is specified and set from the displayed plurality of candidate conditions for retrieving as a second condition for retrieving, and the required phrase is retrieved and selected from a storage medium according to the first and second conditions for retrieving, whereby the candidate conditions for retrieving that help a user set a condition for retrieving are provided to the user, which allows convenience of the processing for retrieving and selecting a phrase to be improved.

With the phrase retrieving/selecting method according to the present invention, when a plurality of candidate conditions for retrieving are to be displayed, only the candidate conditions for retrieving related to the first retrieving condition are displayed according to the set first condition for retrieving, so that candidate conditions for retrieving are provided to a user according to a concept of the phrase the user desires as a result of retrieving and selecting, which allows appropriate conditions for retrieving to easily be set.

With the phrase retrieving/selecting method according to the present invention, after any candidate condition for retrieving is specified and set from the displayed plurality of candidate conditions for retrieving as a second condition for retrieving, addition and setting either of the second condition for retrieving or execution of retrieving and setting is specified, the plurality of candidate conditions for retrieving are displayed when the addition and setting of the second condition for retrieving has been specified, any candidate condition for retrieving is further specified and additionally set from the displayed plurality of candidate conditions for retrieving as the second condition for retrieving, and the required phrase is retrieved and selected from the storage medium according to the first and second conditions for retrieving when the execution of retrieving and selecting has been specified, and for this reason the plurality of conditions for retrieving can be set, which allows a more appropriate result of retrieving and selecting to be obtained.

With the phrase retrieving/selecting method according to the present invention, after any candidate condition for retrieving is specified and set from the displayed plurality of candidate conditions for retrieving as a second condition for retrieving, and when the addition and setting of the second condition for retrieving are specified, the plurality of candidate conditions for retrieving excluding any candidate conditions for retrieving having already been set as the second condition for retrieving are displayed, and for this reason the user may not carelessly specify the same candidate condition for retrieving, which allows convenience of the processing for retrieving and selecting a phrase to be improved.

With the phrase retrieving/selecting method according to the present invention, after any candidate condition for retrieving is specified and set from the displayed plurality of candidate conditions for retrieving as a second condition for retrieving, and when the addition and setting of the second condition for retrieving are specified, the plurality of candidate conditions for retrieving excluding any candidate conditions for retrieving contradictory to those having already been set as the second condition for retrieving are displayed, and for this reason any candidate condition for retrieving inappropriate for retrieving is prevented from being set as one of conditions for retrieving, which makes it possible to prevent any result of retrieving and selecting different from that a user desires from being specified and also to prevent any state such that no result of retrieving and selecting is obtained from being generated.

With the computer-readable recording medium according to the present invention, a program making a computer execute each step in the phrase retrieving/selecting method is recorded therein, so that this program is executed by the computer, which allows convenience of the processing for retrieving and selecting a phrase to be improved.

Other objects and features of this invention will become clear from the following description with reference to the accompanying drawings.

DESCRIPTION OF THE PREFERRED EMBODIMENTS

Detailed description is made hereinafter for one embodiment of the phrase retrieving/selecting method and the computer-readable recording medium with a program making a computer execute each step in the method recorded therein according to the present invention with reference to the attached drawings.

In this embodiment, description is made for the phrase retrieving/selecting method according to the present invention assuming as an example that a text expression dictionary providing various word expressions is used as an object for retrieving and selecting, and that a phrase the user desires is retrieved and selected from a plurality of phrases registered in the text expression dictionary. Also it is assumed that a plurality of heading phrases and a plurality of classifying items according to synonyms, antonyms, and purposes of usage for each heading phrase, and a plurality of phrases are classified and stored in each of the corresponding classifying items in this text expression dictionary.

Figure 1:
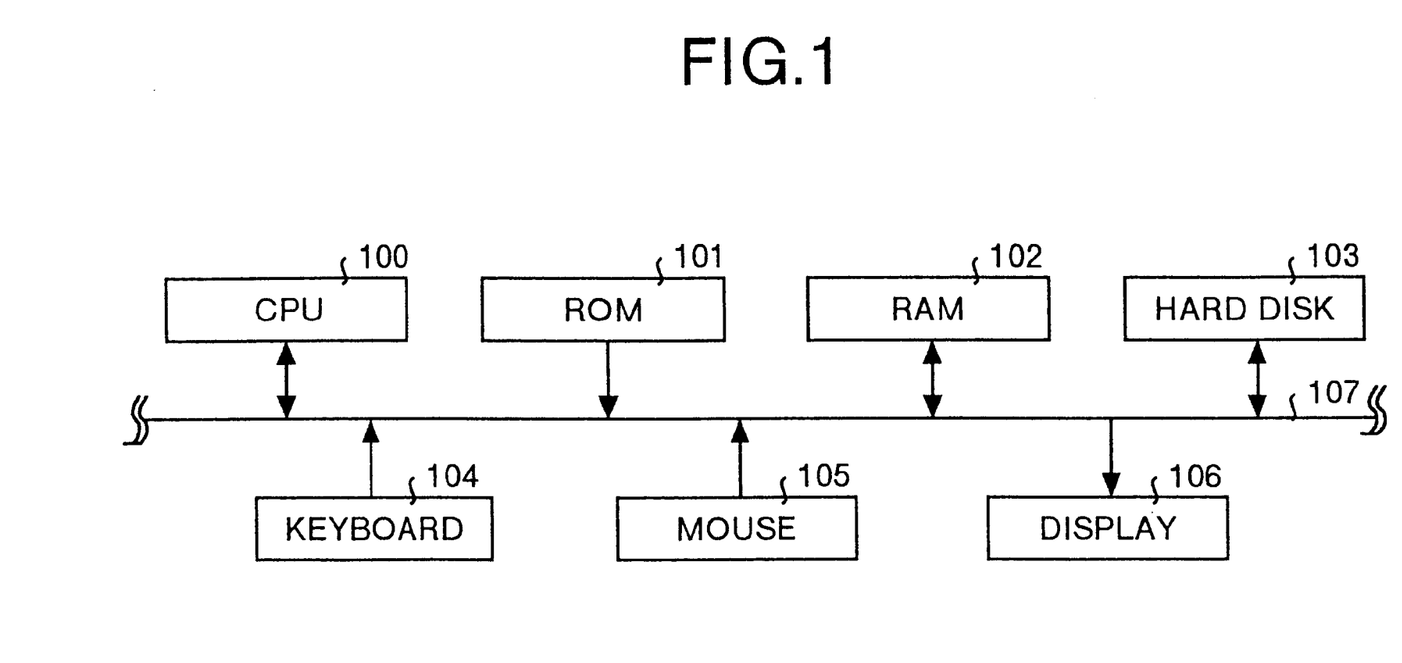
FIG. 1 is a block diagram showing hardware configuration of a computer for executing a phrase retrieving/selecting method according to an embodiment of the present invention.

FIG. 1 is a block diagram showing hardware configuration of a computer for executing a phrase retrieving/selecting method according to the embodiment of the present invention. The computer shown in FIG. 1 comprises a CPU 100 for controlling the device on the whole; a ROM 101 for storing therein a boot program or the like; a RAM 102 used as a work area of the CPU 100, a hard disk 103 for storing therein an operating system (OS), a text expression dictionary as an object for retrieving and selecting, and retrieval/selection software provided for realizing the phrase retrieving/selecting method according to the present invention or the like; a keyboard 104 for executing the processing of entering conditions for retrieving to the retrieval/selection software therethrough; a mouse 105 for executing the processing of specifying a desired retrieving condition from candidate conditions for retrieving provided by the retrieval/selection software therethrough; a display 106 for displaying candidate conditions for retrieving provided by software of conditions for retrieving and a result of retrieving and selecting or the like; and a bus 107 for connecting the above components to each other therethrough.

Figure 2:
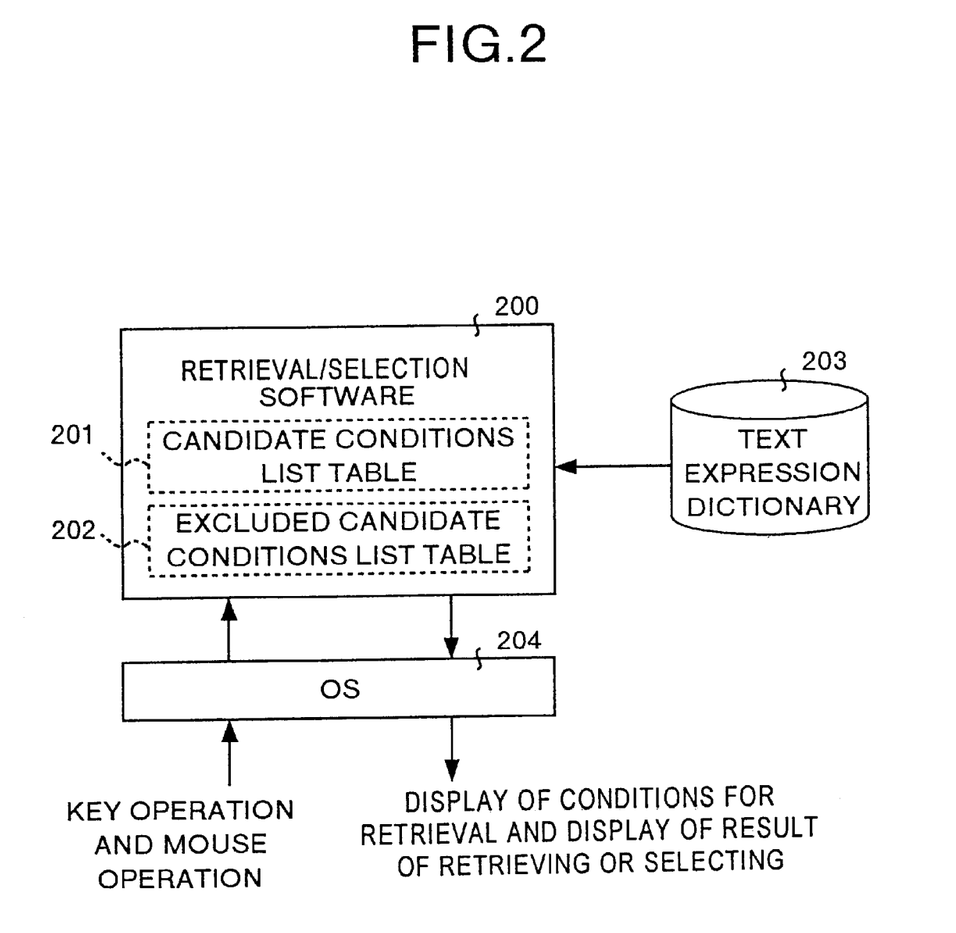
FIG. 2 is a view showing a concept of processing for retrieving and selecting in the phrase retrieving/selecting method according to the embodiment of the present invention.

FIG. 2 is a view showing a concept of processing for retrieving and selecting in the phrase retrieving/selecting method according to the embodiment. The phrase retrieving/selecting method according to the embodiment is realized by retrieval/selection software 200 for executing processing of setting conditions for retrieving and of retrieving and selecting phrases from a text expression dictionary 203 according to the conditions set for retrieving. This retrieval/selection software 200 comprises a candidate conditions list table 201 in which a plurality of candidate conditions for retrieving used when set as conditions for retrieving are registered in order to make it possible to easily set the conditions for retrieving, and an excluded candidate conditions list table 202 used for excluding a plurality of candidate conditions for retrieving (in which AND condition can not be satisfied) contradictory to those having already been set as conditions for retrieving from the plurality of candidate conditions for retrieving, in which the excluded candidate conditions for retrieving are registered so that the candidate conditions for retrieving contradictory to each other in each contents are clearly shown.

It should be noted that, in FIG. 2, the OS 204 controls the processing for entering a result obtained through key operations using the keyboard 104 as well as mouse operations using the mouse 105 executed by a user in the retrieval/selection software 200 as operational information, and for displaying candidate conditions for retrieving provided by the retrieval/selection software 200 as well as a result of retrieving and selecting or the like on the display 106.

Figure 3:
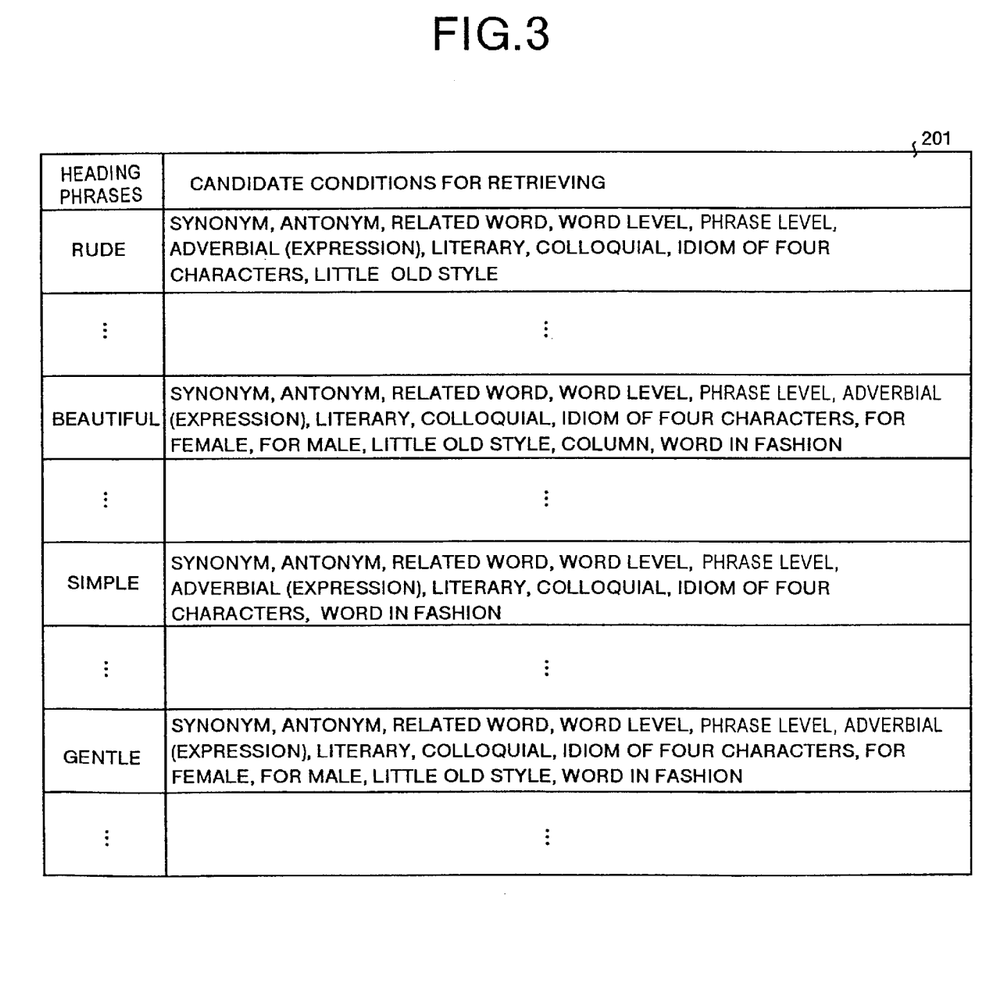
FIG. 3 is an explanatory view showing an example of a candidate conditions list-form table shown in FIG. 2.

FIG. 3 is an explanatory view showing an example of the candidate conditions list table 201 shown in FIG. 2. Registered in this candidate conditions list table 201 are heading phrases and candidate conditions for retrieving that are conditions for retrieving for further retrieving phrases for each of the heading phrases according to a concept of the heading phrase. Each heading phrase in the candidate conditions list table 201 corresponds to each heading phrase in the text expression dictionary 203, and each candidate condition for retrieving corresponds to each of classifying items provided for each heading phrase in the text expression dictionary 203 respectively.

The heading phrases registered in the candidate conditions list table 201 are prepared as candidates for setting a phrase as a first condition for retrieving according to the present invention. A user executes the processing, at first, when retrieving and selecting a phrase, of displaying a list of the heading phrases as a list of candidate heading phrases, specifying and setting a candidate heading phrase corresponding to a concept of a phrase that the user wants to obtain as a result of retrieving and selecting from the displayed list of candidate heading phrases as one of conditions for retrieving.

The candidate conditions for retrieving are provided for setting a phrase as a second condition for retrieving according to the present invention. A user executes processing, when retrieving and selecting a phrase, after the heading phrase is set, for displaying a list of the candidate conditions for retrieving corresponding to the set heading phrase, specifying and setting candidate conditions for retrieving for retrieving a phrase that the user wants to obtain as a result of retrieving and selecting from the displayed candidate conditions for retrieving as one of conditions for retrieving. A plurality of the conditions for retrieving can be set to the previously set heading phrase, and the set heading phrase and at least one of the conditions for retrieving are connected to each other with AND condition to be used for retrieving and selecting the phrase.

It should be noted that, as clearly understood from FIG. 3, different candidate conditions for retrieving are provided for each corresponding heading phrase. This type of configuration is employed because types of phrases that can be classified and ways of using each of the phrases vary for each heading phrase, and for this reason by providing different candidate conditions for retrieving for each heading phrase it is possible to set the most appropriate condition for retrieving for each heading phrase. Accordingly, different candidate conditions for retrieving displayed for setting as a condition for retrieving are displayed from each other according to the previously set heading phrase.

Also in this embodiment, the candidate conditions list table 201 is generated based on the text expression dictionary 203, so that, if the contents of this candidate conditions list table 201 can be covered by the text expression dictionary 203, the candidate conditions list table 201 can be omitted.

Figure 4:
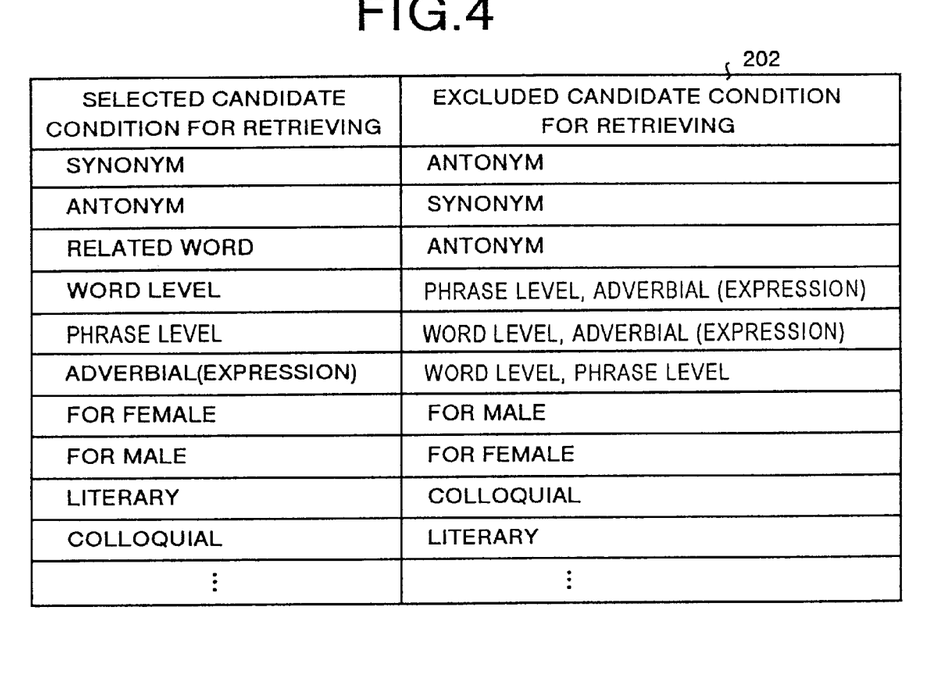
FIG. 4 is an explanatory view showing an example of an excluded candidate conditions list-form table shown in FIG. 2.

FIG. 4 is an explanatory view showing an example of the excluded candidate conditions list table 202 shown in FIG. 2. This excluded candidate conditions list table 202 is used for excluding conditions inappropriate for being added to the already set conditions for retrieving as well as for being set from the candidate conditions for retrieving when a plurality of candidates are specified from the candidate conditions for retrieving and the plurality of specified candidate for retrieving are to be set. More specifically, the table 202 is used, when any condition for retrieving is to be further added after a heading phrase and at least one condition for retrieving for the heading phrase are set, for displaying the candidate conditions for retrieving used for addition and setting as conditions for retrieving excluding those that can not possibly satisfy the AND condition with the previously set conditions for retrieving.

For example, when a user wants to retrieve any phrase used only for female from phrases having a meaning of beautiful, the heading phrase is set to "beautiful", and "for female" is specified and set as conditions for retrieving from the corresponding candidate conditions for retrieving. In this case, "for male" as a candidate retrieval condition for retrieving phrases used only for male is inappropriate as a candidate condition for retrieving used for being added to the already set condition for retrieving of "for female" as well as for being set because the user wants to execute the processing for retrieving any phrase used only for female. The reason is that, when phrases used only for female are to be retrieved from phrases having a meaning of beautiful, the AND condition does not hold between the condition for retrieving of "for female" and that of "for male". Accordingly, the retrieval/selection software 200 displays, when other conditions for retrieving are to be added to the conditions for retrieving already set and to be set, the candidate conditions for retrieving used for addition and setting of conditions for retrieving in a state in which the candidate conditions for retrieving contradictory to the already set condition for retrieving (AND condition does not hold) are excluded according to the excluded candidate conditions list table 202.

Figure 5:
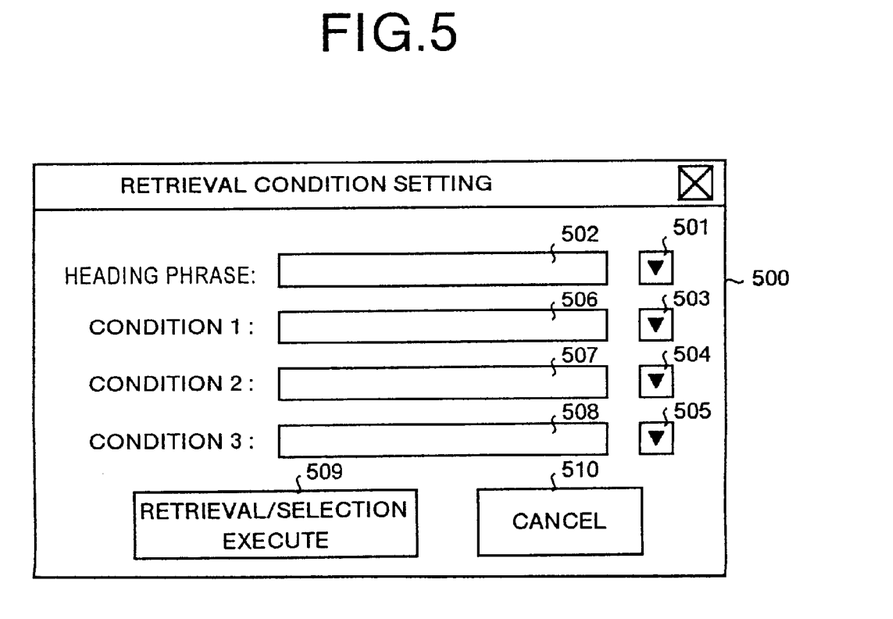
FIG. 5 is an explanatory view showing an example of a conditions for retrieving set screen for setting a heading phrase and at least one condition for retrieving for executing the phrase retrieving/selecting method according to the embodiment of the present invention.

FIG. 5 is an explanatory view showing an example of retrieving condition setting screen for setting a heading phrase and at least one condition for retrieving for executing the phrase retrieving/selecting method according to the embodiment. The retrieving conditions setting screen 500 shown in FIG. 5 comprises a display button 501 for a list of candidate heading phrases for displaying a list of candidate heading phrases registered in the candidate conditions list table 201 shown in FIG. 3, a heading phrase setting box 502 for setting therein a heading phase specified from the displayed list of heading phrases, display buttons 503 to 505 each for a list of candidate conditions for retrieving for displaying a list of candidate conditions for retrieving corresponding to the heading phrase set in the heading phrase setting box 502, retrieving condition setting boxes 506 to 508 each in which a candidate condition for retrieving specified from the displayed list of candidate conditions for retrieving is set as a condition for retrieving, a retrieval/selection executing button 509 for specifying execution of retrieving and selecting according to the heading phrase set in the heading phrase setting box 502 as well as to the retrieval condition set in at least one of the retrieval condition setting boxes 506 to 508, and a cancel button 510 for specifying cancel of the execution of retrieving and selecting.

It should be noted that the retrieving conditions setting screen 500 shown in FIG. 5 is so configured as to be capable of setting three conditions for retrieving by displaying thereon three retrieving condition setting boxes, but the retrieving condition that can be set is not limited to the three conditions.

Figure 6:
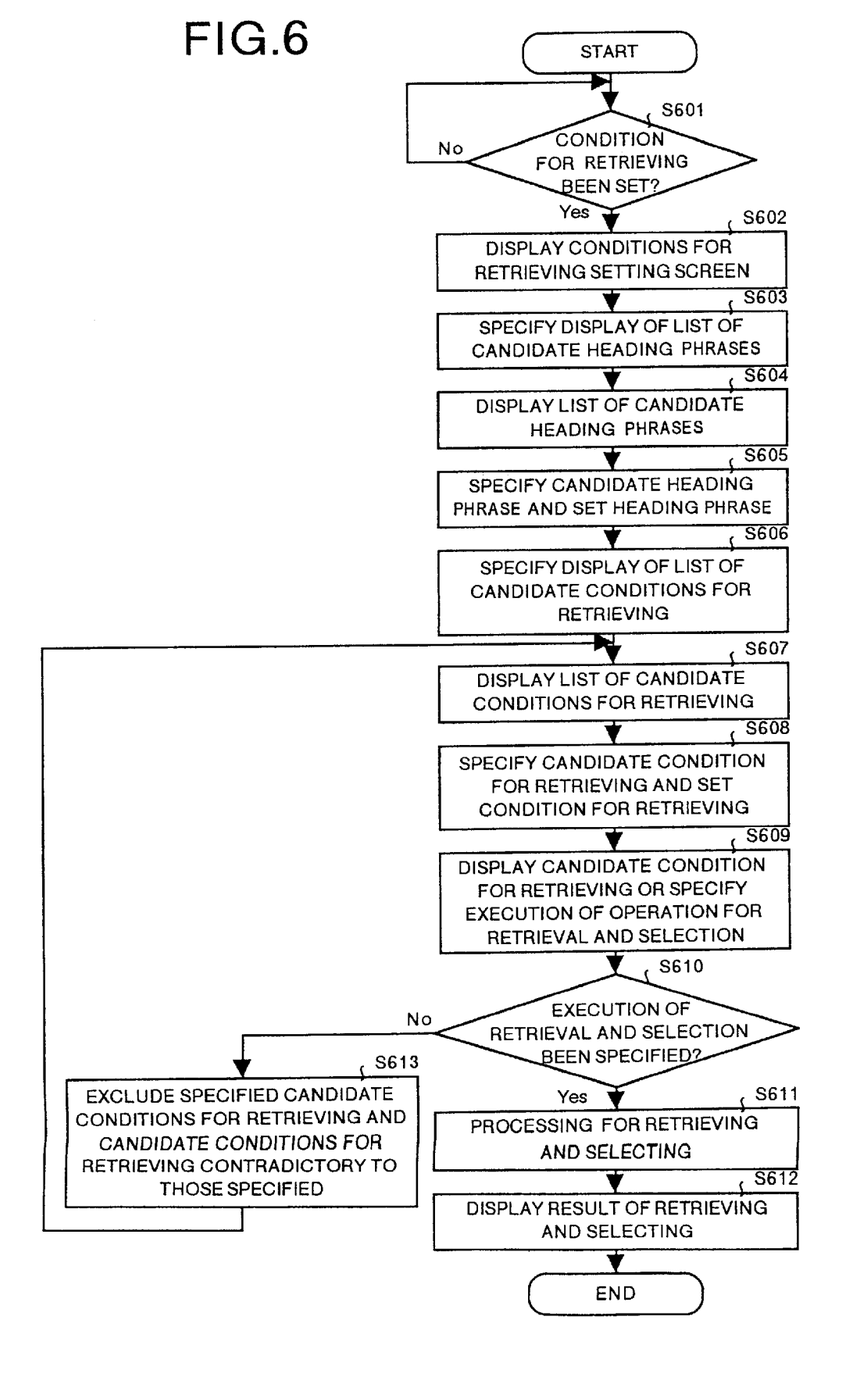
FIG. 6 is a flowchart showing a sequence of retrieving and selecting phrases in the phrase retrieving/selecting method according to the embodiment of the present invention.

Next, detailed description is made for the processing required when the phrase retrieving/selecting method according to the embodiment is executed. FIG. 6 is a flowchart showing a sequence of retrieving and selecting a phrase.

The retrieval/selection software 200 issues a request to the user to set conditions for retrieving by means of key operations or mouse operations executed by the user (S601), and displays, when the conditions are set, the conditions for retrieving setting screen 500 on the display unit 106 (S602).

Figure 7A:
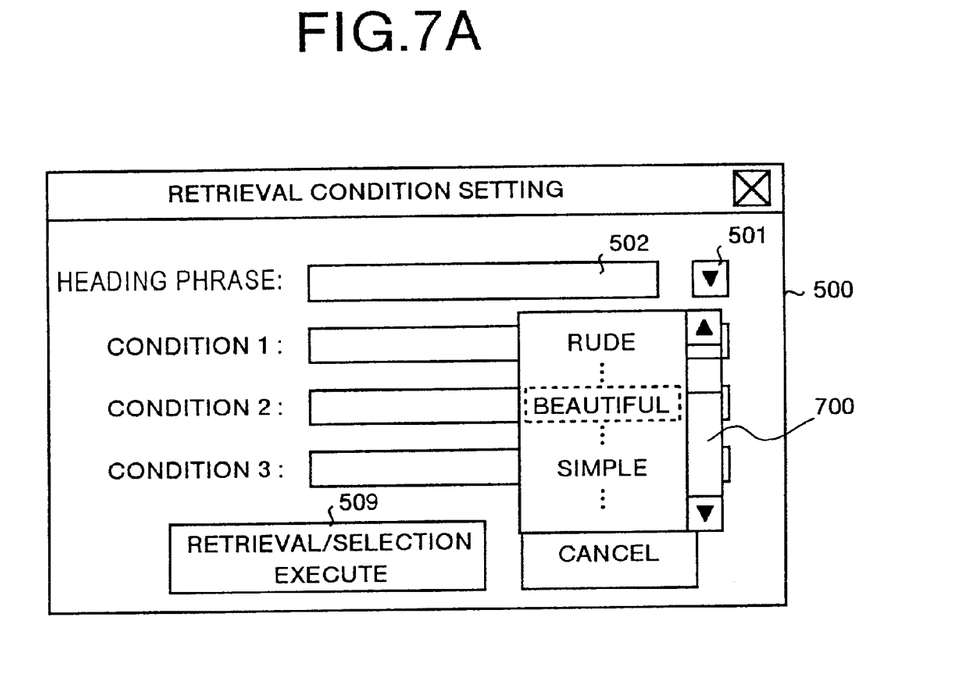
FIG. 7A is an explanatory view showing an example of a state in which a list of heading phrases is displayed on a screen.

When the retrieving conditions setting screen 500 is displayed on the display unit, the user clicks on the display button 501 for a list of candidate heading phrases with the mouse 105 to specify a display of the list of candidate heading phrases (S603: condition setting step). The retrieval/selection software 200 displays, when the display of the list of candidate heading phrases has been specified, a list of candidate heading phrases 700 as shown in FIG. 7A on a screen according to the candidate conditions list table 201 (S604: condition setting step). It should be noted that FIG. 7A is an explanatory view showing an example of a state in which the list of candidate heading phrases 700 is displayed on the screen.

Figure 7B:
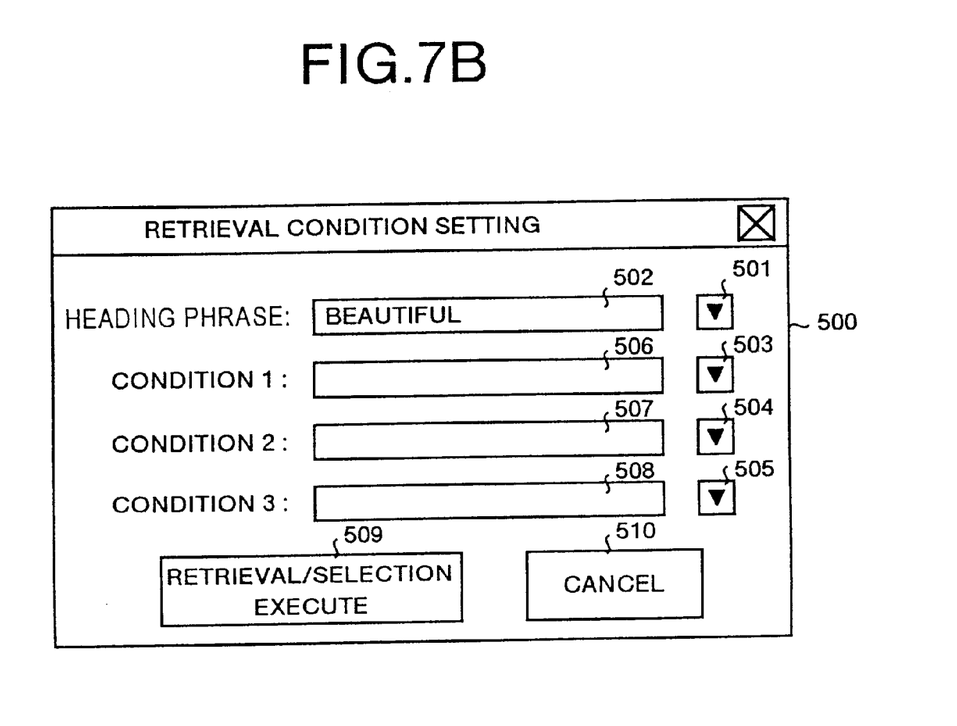
FIG. 7B is an explanatory view showing an example of a state in which a heading phrase is set in a heading phrase setting box in the phrase retrieving/selecting method according to the embodiment of the present invention.

When the list of candidate heading phrases 700 is displayed on the screen, the user specifies a candidate heading phrase corresponding to a concept of the phrase that the user desires as a result of retrieving and selecting from the displayed list of the candidate heading phrases 700, and the retrieval/selection software 200 sets the candidate heading phrase specified by the user in the heading phrase setting box 502 as a heading phrase (S605: condition setting step). It should be noted that FIG. 7B is an explanatory view showing an example of a state in which the heading phrase is set in the heading phrase setting box 502. Herein "beautiful" is set as a heading phrase.

Figure 8A:
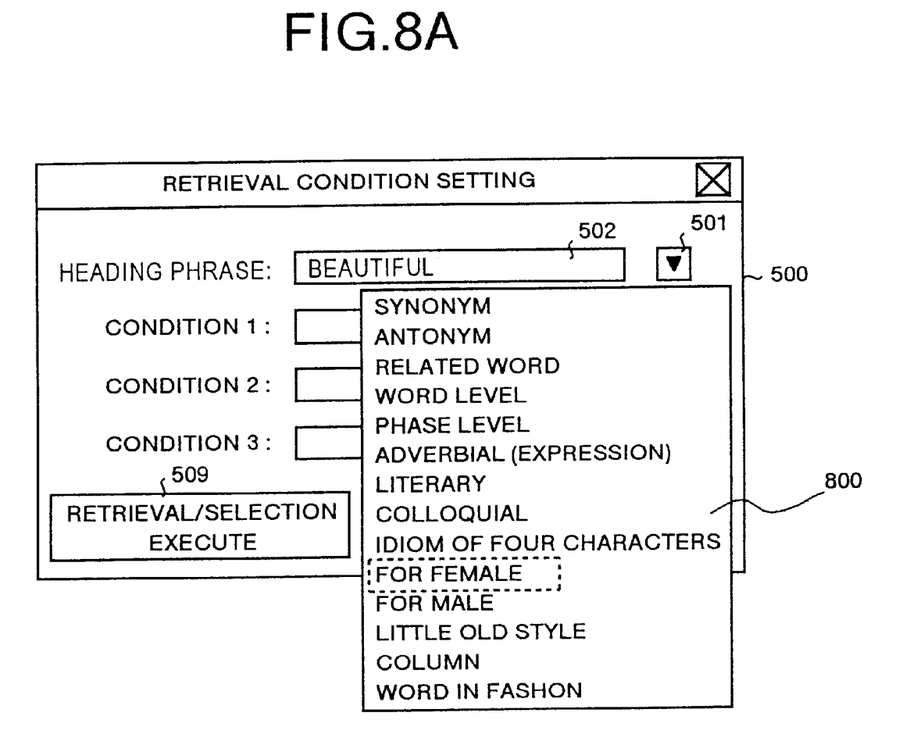
FIG. 8A is an explanatory view showing an example of a state in which a list of candidate conditions for retrieving is displayed on the screen.

Then, the user clicks on the display button 503 for a list of candidate conditions for retrieving with the mouse 105 to specify a display of the list of candidate conditions for retrieving corresponding to the heading phrase set in step S605 (S606: candidate displaying step). The retrieval/selection software 200 displays, when display of the list of candidate conditions for retrieving is specified, a list 800 of candidate conditions for retrieving as shown in FIG. 8A on a screen according to the candidate conditions list table 201 (S607: candidate displaying step). It should be noted that FIG. 8A is an explanatory view showing an example of a state in which the list 800 of candidate conditions for retrieving is displayed on the screen.

The list 800 of candidate conditions for retrieving displayed in this step S607 displays only the candidate conditions for retrieving related to heading phrases according to the heading phrase set in step S605. Accordingly, if the heading phrase set in step S605 is not "beautiful" but "violent", for example, the list 800 of candidate conditions for retrieving shown in FIG. 8A becomes different from that of the above list. As described above, only candidate conditions for retrieving related to the previously set heading phrase are displayed, which makes it possible to prevent erroneous processing for retrieving and selecting from being executed due to setting of conditions for retrieving which can not be conditions for retrieving the set heading phrase. It should be noted that, as examples of conditions for retrieving which can not be conditions for retrieving a set heading phrase, there are conditions for retrieving of "for female" and "for male" used in combination with the heading phrase of "simple" as shown in FIG. 3.

Figure 8B:
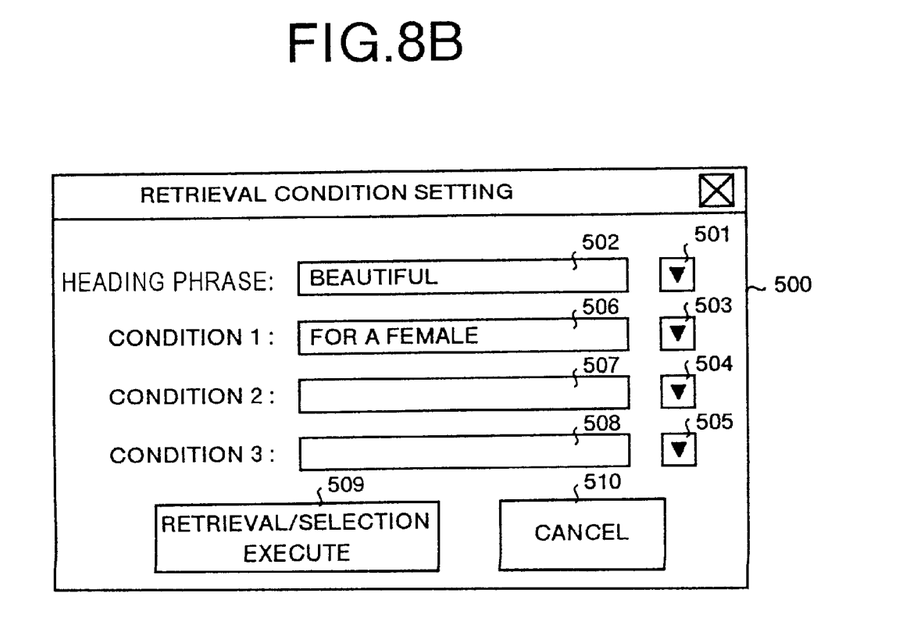
FIG. 8B is an explanatory view showing an example of a state in which one of the conditions for retrieving is set in a condition for retrieving setting box in the phrase retrieving/selecting method according to the embodiment of the present invention.

When the list 800 of candidate conditions for retrieving is displayed on the screen, the user specifies the most appropriate candidate retrieving condition for retrieving the phrase that the user desires as a result of retrieving and selecting from the list 800 of the candidate conditions for retrieving displayed thereon, and the retrieval/selection software 200 sets the candidate condition for retrieving specified by the user in the retrieval condition setting box 506 as a condition for retrieving (S608: candidate specifying step). It should be noted that FIG. 8B is an explanatory view showing an example of a state in which the retrieval condition is set in the retrieval condition setting box 506. Herein "for female" is set as a condition for retrieving.

Then, the user clicks on the display button 504 for candidate conditions for retrieving with the mouse 105 when further adding and setting a condition for retrieving, and clicks on the retrieval/selection executing button 509 with the mouse 105 when finishing the operation for setting conditions for retrieving and executing the operation for retrieval and selection (S609: specifying step).

Then the retrieval/selection software 200 makes determination as to whether execution of retrieval and selection has been specified in step S609 or not (S610: specifying step).

When it is determined in step S610 that execution of retrieval and selection has been specified, the retrieval/selection software 200 executes the processing for retrieving and selecting the corresponding phrase from the text expression dictionary 203 with [the heading phrase "beautiful"] AND [the retrieval condition "for female"] as a condition thereof (S611: retrieving/selecting step). As a result, the retrieval/selection software 200 retrieves and selects a phrase corresponding to the conditions that the heading phrase has a meaning of beautiful and is used for a female, and displays a result of retrieving and selecting on the display 106 (S612: retrieving/selecting step).

On the other hand, when it is determined in step S610 that execution of retrieval and selection has not been specified, namely that display of the list of candidate conditions for retrieving has been specified, the retrieval/selection software 200 shifts the processing to step S613.

The retrieval/selection software 200 executes the processing for excluding the same candidate conditions for retrieving as those specified and set in step S608 as conditions for retrieving from the list of candidate retrieving conditions displayed on the screen in the step S607 as well as any candidate conditions for retrieving contradictory to (AND condition does not hold) those specified and set as conditions for retrieving from the candidate conditions for retrieving, so that both of the candidates as described above are not displayed in the next step S607 (S613: candidate displaying step).

When determination is made as to which of the candidate conditions for retrieving is contradictory to those specified and set as retrieval conditions (AND condition does not hold), the excluded candidate conditions list table 202 shown in FIG. 4 are referred to.

In the embodiment, the candidate condition for retrieving specified and set as a condition for retrieving is "for female", so that this candidate retrieving condition of "for female" is excluded so as not to be displayed again, and "for male" as a candidate condition for retrieving contradictory to that of "for female" is also excluded so as not to be displayed.

Figure 9A:
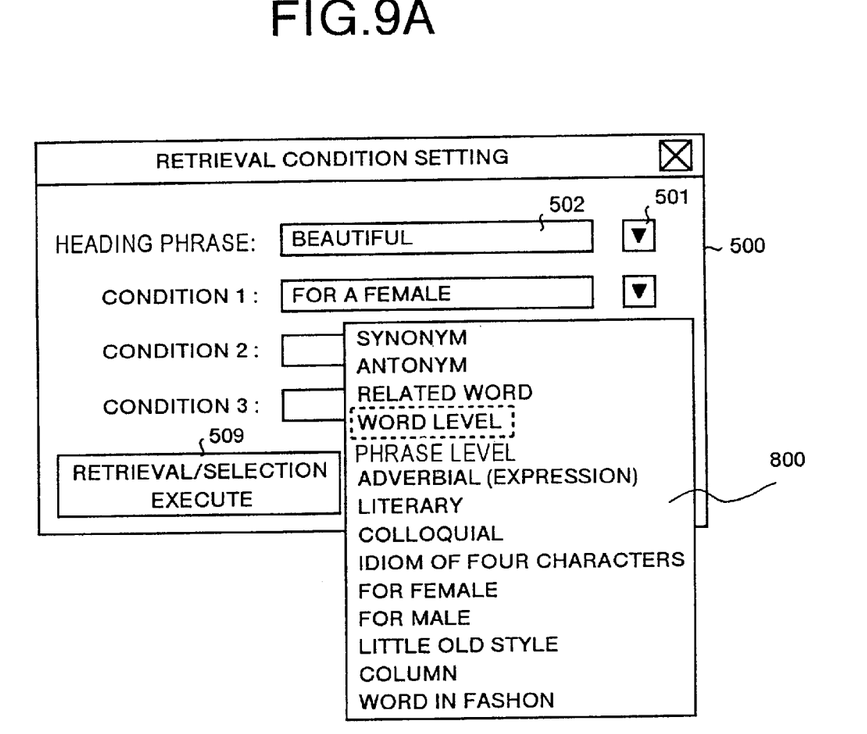
FIG. 9A is an explanatory view showing an example of a state in which a list of candidate conditions for retrieving is displayed on the screen without displaying candidate conditions for retrieving excluded by the processing for excluding.

The retrieval/selection software 200 displays again the list 800 of candidate conditions for retrieving on the screen without displaying, according to the processing for excluding in step S613, the corresponding candidate conditions for retrieving (S607: candidate displaying step). It should be noted that FIG. 9A is an explanatory view showing an example of a state in which the list 800 of candidate conditions for retrieving is displayed on the screen without displaying candidate conditions for retrieving excluded by the processing for excluding. As clearly understood from comparison between FIG. 8A and FIG. 9A, that the candidate conditions for retrieving of "for female" and "for male" are excluded from the list 800 of candidate conditions for retrieving in FIG. 9A.

As described above, the same candidate conditions for retrieving as those specified and set as conditions for retrieving are excluded so as not to be displayed, which allows operability of retrieval and selection to be improved, and for this reason the user is prevented from specifying the same candidate condition again for retrieving. Also, the candidate conditions for retrieving contradictory to those specified and set as conditions for retrieving (those for which AND condition does not hold) are excluded so as not to be displayed, which makes it possible to prevent any candidate retrieving condition inappropriate for retrieving a desired phrase from being set as a condition for retrieving, to prevent any result of retrieving and selecting different from that the user desires, or generation of any state where no result of retrieving and selecting is obtained.

It should be noted that in this embodiment, the user can not specify any of candidate conditions for retrieving excluded by the processing in step S613 because they are not displayed, instead, corresponding candidate conditions for retrieving may be set so as not to be specified, and also by displaying these conditions in gray-out mode teaching the user that these conditions can not be specified.

Figure 9B:
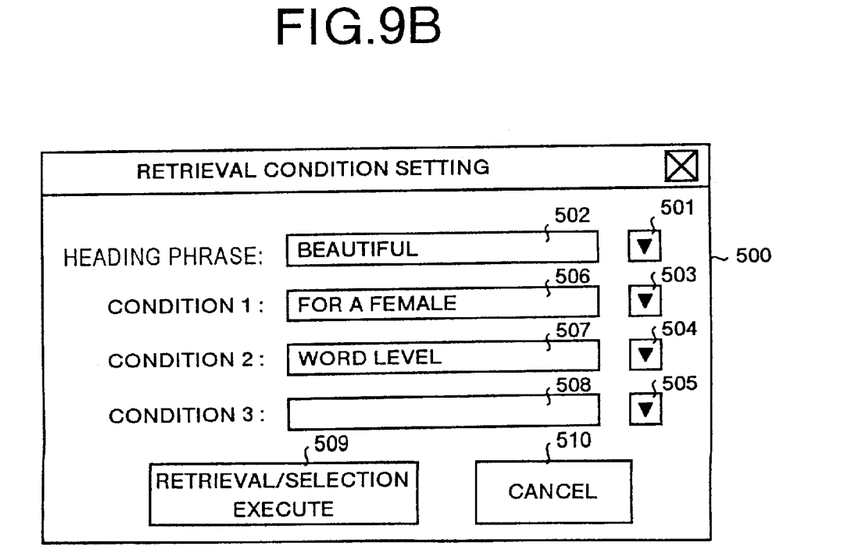
FIG. 9B is an explanatory view showing an example of a state in which one of the conditions for retrieving is further set in the next retrieval condition setting box in the phrase retrieving/selecting method according to the embodiment of the present invention.

Then, the user specifies any candidate condition for retrieving for adding and setting as a retrieving condition for retrieving the phrase that the user desires as a result of retrieving and selecting from the list 800 of the candidate conditions for retrieving shown in FIG. 9A, and the retrieval/selection software 200 sets the candidate condition for retrieving specified by the user in the retrieval condition setting box 507 as a condition for retrieving (S608: candidate specifying step). It should be noted that FIG. 9B is an explanatory view showing an example of a state in which one of the conditions for retrieving is further set in the next retrieval condition setting box 507. There is set herein "a word level" as a condition for retrieving.

Further, the user clicks on the display button 504 for candidate conditions for retrieving with the mouse 105 when further adding and setting a condition for retrieving, and clicks on the retrieval/selection executing button 509 with the mouse 105 when finishing the operation for setting conditions for retrieving and executing the retrieval and selection (S609: specifying step).

Then the retrieval/selection software 200 determines as to whether the execution of retrieval and selection has been specified in step S609 or not (S610: specifying step).

When it is determined in step S610 that execution of retrieval and selection has been specified, the retrieval/selection software 200 executes the processing for retrieving and selecting the corresponding phrase from the text expression dictionary 203 with [the heading phrase "beautiful"] AND [the retrieval condition "for female"] AND [the retrieval condition "a word level"] as conditions thereof (S611: retrieving/selecting step). As a result, the retrieval/selection software 200 retrieves and selects any phrase corresponding to the conditions for a word having a meaning of beautiful and used for a female, and displays a result of retrieval and selection on the display unit 106 (S612: retrieving/selecting step).

On the other hand, when it is determined in step S610 that execution of retrieval and selection has not been specified, namely that display of the list of candidate conditions for retrieving has been specified, the retrieval/selection software 200 shifts the processing to step S613. In this case, the candidate condition for retrieving specified and set as a condition for retrieving in step S608 is "a word level", so that the candidate condition for retrieving of "a word level" that is the same as the above condition is excluded, and the candidate conditions for retrieving "a phrase level" and "adverbial expression" are also excluded according to the excluded candidate conditions list table 202 shown in FIG. 4.

It should be noted that the sequence subsequent to the above steps is as described above and detailed description is omitted herein, but termination of the processing is executed by executing the processing for retrieving and selecting and displaying a result thereof after a desired number of conditions for retrieving are set.

As described above, with the phrase retrieving/selecting method according to the embodiment, candidate conditions for retrieving that help a user set a condition for retrieving are provided to the user, which allows improved convenience in the processing for retrieving and selecting a phrase.

Also, with the phrase retrieving/selecting method according to the embodiment, candidate conditions for retrieving are provided to the user according to of the phrase the user desires as a result of retrieving and selecting, which allows appropriate conditions for retrieving to easily be set.

Further, with the phrase retrieving/selecting method according to the embodiment, when a plurality of conditions for retrieving are to be set, some other candidate conditions for retrieving are provided to the user in the relation with the already set conditions for retrieving, which makes it possible to prevent the plurality of conditions for retrieving each expressing contradictory concepts to each other (conditions for retrieving between which AND condition does not hold) from being set.

It should be noted that description of the phrase retrieving/selecting method according to the embodiment above was made assuming retrieval and selection with the text expression dictionary 203 as an object. And for this reason, all the heading phrases and conditions for retrieving are described as specified to the text expression dictionary 203 in the embodiment, but it should be understood that the above description indicates only one of embodiments for the phrase retrieving/selecting method according to the present invention. Namely, it is clear that each of the processing as described below; the processing for providing candidate conditions for retrieving that help a user set a condition for retrieving to the user, the processing for providing candidate conditions for retrieving to the user according to a concept of the phrase the user desires as a result of retrieving and selecting, and the processing for excluding the candidate conditions for retrieving having already been specified and set as conditions for retrieving as well as the candidate conditions for retrieving contradictory thereto (AND condition does not hold) in the following processing for retrieving and selecting is applicable even to a case where an object of retrieving and selecting is set to one other than the text expression dictionary 203. In addition, an arbitrary heading phrase or the like may be entered by the user without selecting it from the given candidates.

Also during preparation of a document, it is possible to immediately obtain any phrases required for preparation of the document by using the phrase retrieving/selecting method according to the embodiment. Accordingly, the phrase retrieving/selecting method according to the embodiment can be used for supporting operations for preparing documents.

Furthermore, the phrase retrieving/selecting method described in relation to the embodiment above can be realized by executing the previously provided program (retrieval/selection software 200) according to the sequence shown in FIG. 6 by any computer (CPU 100) such as a personal computer or a work station. This program can be executed by being recorded in a computer-readable recording medium such as a floppy disk, a CD-ROM, an MO, and a DVD other than the hard disk 103, and by being read out from any of the recording mediums by the computer. In addition, this program can be distributed through any of the recording mediums or any of networks.

As described above, with the phrase retrieving/selecting method according to the present invention, a first condition for retrieving is set, a plurality of candidate conditions for retrieving used for adding and setting other conditions for retrieving in addition to the set first condition for retrieving are displayed, any candidate condition for retrieving is specified and set from the displayed plurality of candidate conditions for retrieving as a second condition for retrieving, and the required phrase is retrieved and selected from a storage medium according to the first and second conditions for retrieving, whereby the candidate conditions for retrieving that help a user set a condition for retrieving are provided to the user, which allows convenience of the processing for retrieving and selecting a phrase to be improved.

With the phrase retrieving/selecting method according to the present invention, when a plurality of candidate conditions for retrieving are to be displayed, only the candidate conditions for retrieving related to the first retrieving condition are displayed according to the set first condition for retrieving, so that candidate conditions for retrieving are provided to a user according to a concept of the phrase the user desires as a result of retrieving and selecting, which allows appropriate conditions for retrieving to easily be set.

With the phrase retrieving/selecting method according to the present invention, after any candidate condition for retrieving is specified and set from the displayed plurality of candidate conditions for retrieving as a second condition for retrieving, addition and setting either of the second condition for retrieving or execution of retrieving and setting is specified, the plurality of candidate conditions for retrieving are displayed when the addition and setting of the second condition for retrieving has been specified, any candidate condition for retrieving is further specified and additionally set from the displayed plurality of candidate conditions for retrieving as the second condition for retrieving, and the required phrase is retrieved and selected from the storage medium according to the first and second conditions for retrieving when the execution of retrieving and selecting has been specified, and for this reason the plurality of conditions for retrieving can be set, which allows a more appropriate result of retrieving and selecting to be obtained.

With the phrase retrieving/selecting method according to the present invention, after any candidate condition for retrieving is specified and set from the displayed plurality of candidate conditions for retrieving as a second condition for retrieving, and when the addition and setting of the second condition for retrieving are specified, the plurality of candidate conditions for retrieving excluding any candidate conditions for retrieving having already been set as the second condition for retrieving are displayed, and for this reason the user may not carelessly specify the same candidate condition for retrieving, which allows convenience of the processing for retrieving and selecting a phrase to be improved.

With the phrase retrieving/selecting method according to the present invention, after any candidate condition for retrieving is specified and set from the displayed plurality of candidate conditions for retrieving as a second condition for retrieving, and when the addition and setting of the second condition for retrieving are specified, the plurality of candidate conditions for retrieving excluding any candidate conditions for retrieving contradictory to those having already been set as the second condition for retrieving are displayed, and for this reason any candidate condition for retrieving inappropriate for retrieving is prevented from being set as one of conditions for retrieving, which makes it possible to prevent any result of retrieving and selecting different from that a user desires from being specified and also to prevent any state such that no result of retrieving and selecting is obtained from being generated.

With the computer-readable recording medium according to the present invention, a program making a computer execute each step in the phrase retrieving/selecting method described above is recorded therein, so that this program is executed by the computer, which allows convenience of the processing for retrieving and selecting a phrase to be improved.

This application is based on Japanese patent application No. HEI 9-253908 filed in the Japanese Patent Office on Sep. 18, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A phrase retrieving/selecting method of retrieving phrases from a storage medium with a plurality of phrases stored therein and selecting a phrase from the retrieved phrases comprising:

a condition setting step of setting a heading phrase from a plurality of predetermined heading phrases as a first condition for retrieving, said heading phrase corresponding to a plurality of candidate conditions;

a candidate displaying step of displaying the plurality of candidate conditions for retrieving for setting other retrieving conditions in addition to the first condition for retrieving;

a candidate specifying step of setting a second condition for retrieving by selecting a candidate condition for retrieving displayed in said candidate displaying step; and a retrieving/selecting step of retrieving and selecting an appropriate phrase from said storage medium based on said first and second conditions for retrieving.

2. A phrase retrieving/selecting method according to claim 1 wherein, in said candidate displaying step, when displaying the plurality of candidate conditions for retrieving as candidates, only those candidate conditions for retrieving related to said first condition for retrieving are displayed based on the first condition for retrieving set in said condition setting step.

3. A phrase retrieving/selecting method according to claim 2 further comprising:

a specifying step after said candidate specifying step for selecting and specifying additional conditions to of said second condition for retrieving or execution of retrieving and selection; and also wherein, in said candidate displaying step and candidate specifying step, when additional setting of the second conditions for retrieving is specified in said specifying step, said plurality of candidate conditions for retrieving are displayed, any candidate condition for retrieving is specified from the displayed plurality of candidate conditions for retrieving, said specified condition for retrieving are additionally set as the second condition for retrieving, and in said retrieving/selecting steps, when execution of retrieving and selection is specified in said specifying step, appropriate phrases are retrieved and selected from said storage medium based on said first and second conditions for retrieving.

4. A phrase retrieving/selecting method according to claim 3; wherein, in said candidate displaying step, when addition and setting of the second condition for retrieving is specified in said specifying step, said plurality of candidate conditions for retrieving excluding that already set as the second condition for retrieving are displayed.

5. A phrase retrieving/selecting method according to claim 4; wherein, in said candidate displaying step, when additional second condition for retrieving is specified in said specifying step, said plurality of candidate conditions for retrieving excluding those contradictory to that already set as the second condition for retrieving are displayed.

6. A phrase retrieving/selecting method according to claim 3; wherein, in said candidate displaying step, when additional second condition for retrieving is specified in said specifying step, said plurality of candidate conditions for retrieving excluding those contradictory to that already set as the second condition for retrieving are displayed.

7. A phrase retrieving/selecting method according to claim 1 further comprising:

a specifying step after said candidate specifying step for selecting and specifying additional conditions to of said second condition for retrieving or execution of retrieving and selection; and also wherein, in said candidate displaying step and candidate specifying step, when additional setting of the second conditions for retrieving is specified in said specifying step, said plurality of candidate conditions for retrieving are displayed, any candidate condition for retrieving is specified from the displayed plurality of candidate conditions for retrieving, said specified condition for retrieving are additionally set as the second condition for retrieving, and in said retrieving/selecting steps, when execution of retrieving and selection is specified in said specifying step, appropriate phrases are retrieved and selected from said storage medium based on said first and second conditions for retrieving.

8. A phrase retrieving/selecting method according to claim 7; wherein, in said candidate displaying step, when addition and setting of the second condition for retrieving is specified in said specifying step, said plurality of candidate conditions for retrieving excluding that already set as the second condition for retrieving are displayed.

9. A phrase retrieving/selecting method according to claim 8; wherein, in said candidate displaying step, when additional second condition for retrieving is specified in said specifying step, said plurality of candidate conditions for retrieving excluding those contradictory to that already set as the second condition for retrieving are displayed.

10. A phrase retrieving/selecting method according to claim 7; wherein, in said candidate displaying step, when additional second condition for retrieving is specified in said specifying step, said plurality of candidate conditions for retrieving excluding those contradictory to that already set as the second condition for retrieving are displayed.

11. A computer-readable recording medium storing therein a program making a computer perform each step of the phrase retrieving/selecting method according to claim 1.

* * * * *